United States Patent
Guim Bernat et al.

(10) Patent No.: US 12,445,385 B2
(45) Date of Patent: Oct. 14, 2025

(54) SWITCH-BASED ADAPTIVE TRANSFORMATION FOR EDGE APPLIANCES

(71) Applicant: Intel Corporation, Santa Clara, CA (US)

(72) Inventors: Francesc Guim Bernat, Barcelona (ES); Karthik Kumar, Chandler, AZ (US); Thomas E. Willis, Redwood City, CA (US); Timothy Verrall, Pleasant Hill, CA (US); Robert G. Southworth, Chatsworth, CA (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 17/357,358

(22) Filed: Jun. 24, 2021

(65) Prior Publication Data
US 2021/0320875 A1   Oct. 14, 2021

(51) Int. Cl.
*H04L 47/2425* (2022.01)
*H04L 47/2441* (2022.01)

(52) U.S. Cl.
CPC ...... *H04L 47/2433* (2013.01); *H04L 47/2441* (2013.01)

(58) Field of Classification Search
CPC ............. H04L 47/2433; H04L 47/2441; H04L 47/2425; H04L 47/38; H04L 47/29; H04L 49/20
See application file for complete search history.

(56) References Cited

U.S. PATENT DOCUMENTS

| | | | |
|---|---|---|---|
| 2014/0351229 A1* | 11/2014 | Gupta | H03M 7/607 707/693 |
| 2019/0034829 A1* | 1/2019 | Guim Bernat | G06F 3/0655 |
| 2019/0245555 A1* | 8/2019 | Nam | H03M 7/6082 |
| 2019/0379610 A1* | 12/2019 | Srinivasan | H04L 47/627 |
| 2021/0044445 A1* | 2/2021 | Bottorff | H04L 12/185 |

* cited by examiner

*Primary Examiner* — Ricky Q Ngo
*Assistant Examiner* — Kabir U Jahangir
(74) *Attorney, Agent, or Firm* — Schwegman Lundberg & Woessner, P.A.

(57) ABSTRACT

A network switch includes a memory device to store a stream information of a plurality of data streams being handled by the network switch, the stream information including a stream identifier, a stream service level agreement (SLA), and a stream traffic type; accelerator circuitry to apply stream transformation functions to data streams; telemetry circuitry to monitor egress ports of the network switch; and scheduler circuitry to: receive telemetry data from the telemetry circuitry to determine that a utilization of egress ports of the network switch is over a threshold utilization; determine a selected data stream of the plurality of data streams to transform; use the accelerator circuitry to transform the selected data stream to produce a transformed data stream, wherein the transformed data stream complies with a corresponding stream SLA; and transmit the transformed data stream on an egress port.

24 Claims, 9 Drawing Sheets

SWITCH-BASED ADAPTIVE TRANSFORMATION FOR EDGE APPLIANCES

TECHNICAL FIELD

Embodiments described herein generally relate to data transformation and network systems and in particular, to a system that provides switch-based adaptive transformation for edge appliances.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. In a similar manner. Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to security and trust, and the operational states of software programs and data, as represented in memory (e.g., DRAM memory), cache memory (e.g., in a cache), or registers (e.g., CPU, or GPU).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
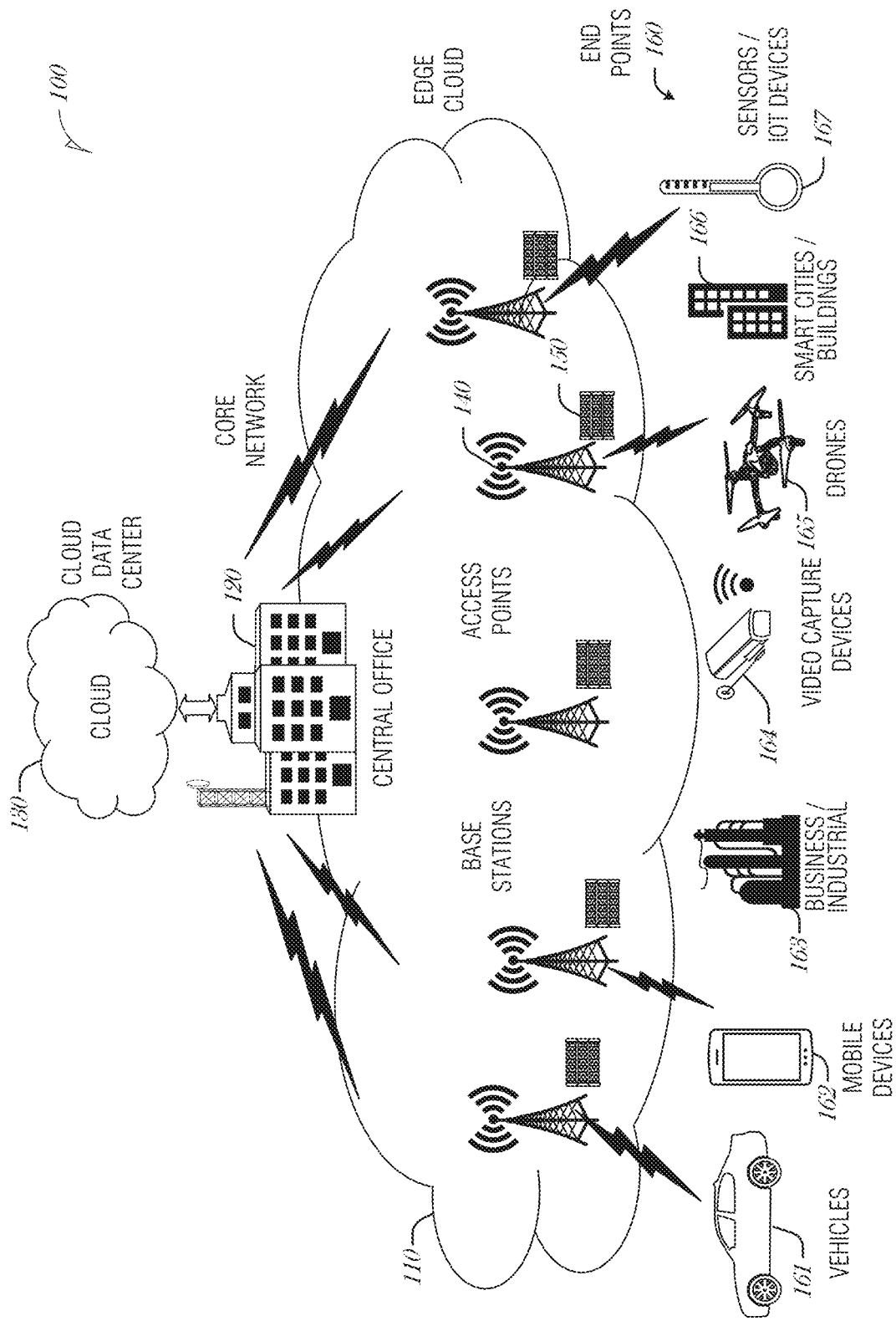
FIG. 1 illustrates an overview of an edge cloud configuration for edge computing.

Systems and methods described herein provide a system that provides switch-based adaptive transformation for edge appliances. In various examples, the systems and methods described herein enables switches to perform required stream transformations to push the envelope in meeting low latency, high bandwidth requirements of edge computing. Such a mechanism improves overall data throughput and increases the efficiency when provisioning according to multiple service level agreements (SLA).

Edge computing is an emerging paradigm where there is a need for low latency access to high volumes of data. Example use cases include autonomous vehicle operation, drone usage, or the like, which send and receive streams to the edge cloud (e.g., devices situated near or in base stations or closely located central offices for low latency data access). As part of the edge backbone/infrastructure, switches in base stations and closely located network infrastructure need to facilitate this low latency, high bandwidth access for multiple streams of data.

One of the key challenges that emerges with such scenarios is that conventional switches treat data streams as a black box. At best, even the most advanced switches only service policies such as quality of service (QoS) enforcements, which deal with lane prioritization or scheduling of requests. When faced with an overwhelming volume of data, there is currently nothing that can be done to alleviate the data pressure, and more importantly to be able to maintain the end-to-end performance guarantees that are required for edge computing. The fundamental reason for this deficiency is that in order to provide any prioritization beyond plain QoS, the switch needs to comprehend the streams of traffic and not treat them as a black box. This requires some context and application specific knowledge of the data streams.

The systems and methods described in the present document address this problem by enabling switches to perform required stream transformations to push the envelope in meeting low latency, high bandwidth requirements of edge computing. By transforming one or more streams that pass through the switch, the switch is able to service more streams that would normally be processed.

For illustration, consider an over-simplified example of having five streams of data that need to be transmitted through a switch. Streams 1 and 5 are high priority data streams, while streams 2, 3, and 4 are low priority data streams.

With a naïve QoS-unaware policy, the switch may service streams serially, such that streams 1, 2, and 3 are transmitted through the switch. While streams 1, 2, and 3 are transmitted, and this satisfies a low-latency requirement for these streams, streams 4 and 5 do not satisfy this requirement. Thus, this is a suboptimal arrangement because stream 5 is a high priority stream.

A QoS-aware scheme may prioritize streams 1 and 5, and as such may transmit streams 1, 5, and 2. Again, this may leave out streams 3 and 4, which may violate a low-latency requirement.

The innovative system provided here may analyze the low-priority streams 2, 3, and 4, and determine that based on properties, context, or other data, streams 2 and 3 may be transformed so that they can be transmitted with a lower data requirement. As such, after transformation, streams 1, 5, 2, and 3 may all be transmitted through the switch. This will result in streams 1, 5, 2, and 3 meeting their low-latency requirement, even if streams 2 and 3 are at lower fidelity due to transformation.

Note that the transform can be one of various options specific to the application and may be based on fidelity/entropy/data volume. Current switch architectures do not have any mechanisms for accepting pre-registration of these transformation functions, programming them via FPGA (or other means of compute on the switch), or executing them adaptively on the switch. These functions and others are described in more detail below.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
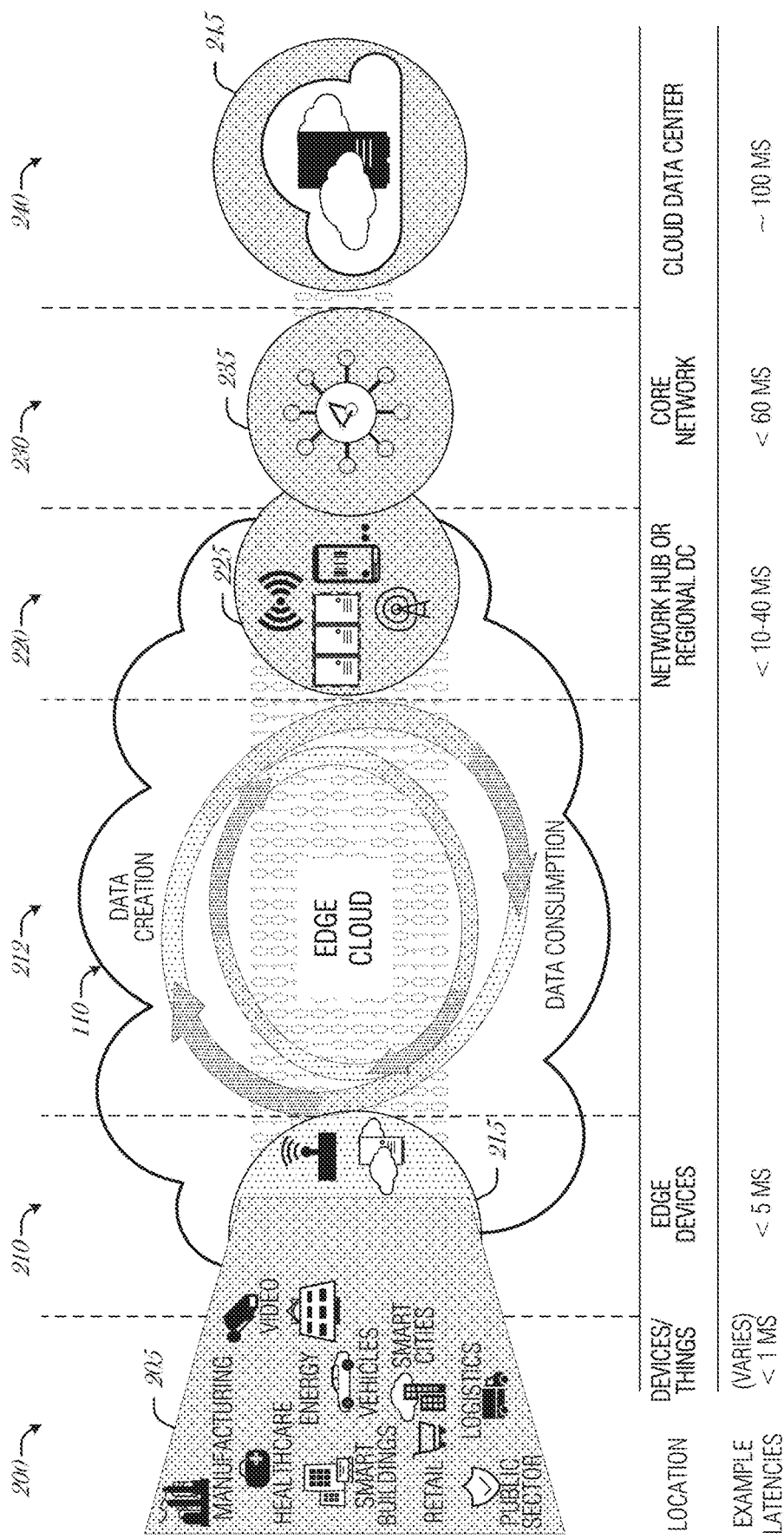
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights. LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 4B. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
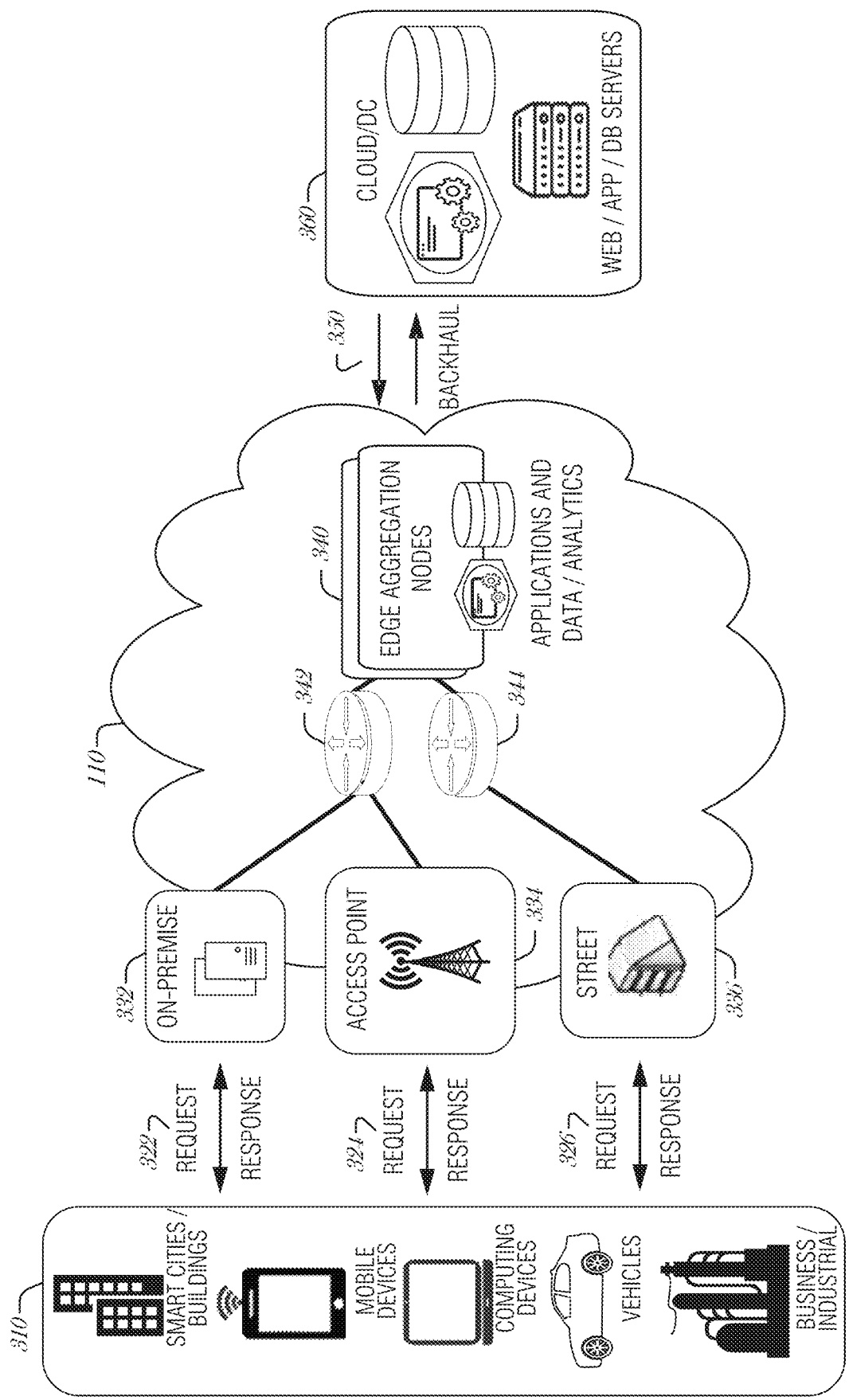
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

In further examples, any of the compute nodes or devices discussed with reference to the present edge computing systems and environment may be fulfilled based on the components depicted in FIGS. 4A and 4B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 4A:
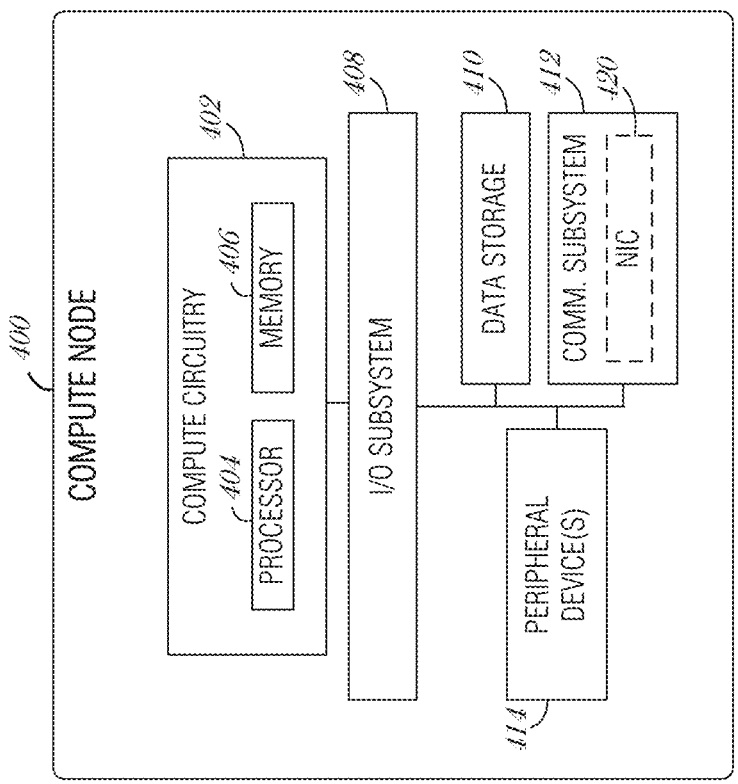
FIG. 4A provides an overview of example components for compute deployed at a compute node in an edge computing system.

In the simplified example depicted in FIG. 4A, an edge compute node 400 includes a compute engine (also referred to herein as "compute circuitry") 402, an input/output (I/O) subsystem 408, data storage 410, a communication circuitry subsystem 412, and, optionally, one or more peripheral devices 414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 400 may be embodied as any type of engine, device, or collection of devices capable of performing various compute functions. In some examples, the compute node 400 may be embodied as a single device such as an integrated circuit, an embedded system, a field-programmable gate array (FPGA), a system-on-a-chip (SoC), or other integrated system or device. In the illustrative example, the compute node 400 includes or is embodied as a processor 404 and a memory 406. The processor 404 may be embodied as any type of processor capable of performing the functions described herein (e.g., executing an application). For example, the processor 404 may be embodied as a multi-core processor(s), a microcontroller, a processing unit, a specialized or special purpose processing unit, or other processor or processing/controlling circuit.

In some examples, the processor 404 may be embodied as, include, or be coupled to an FPGA, an application specific integrated circuit (ASIC), reconfigurable hardware or hardware circuitry, or other specialized hardware to facilitate performance of the functions described herein. Also, in some examples, the processor 404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SoC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SoC, a CPU, and other variations of the processor 404 may work in coordination with each other to execute many types of operations and instructions within and on behalf of the compute node 400.

The memory 406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 406 may be integrated into the processor 404. The memory 406 may store various software and data used during operation such as one or more applications, data operated on by the application(s), libraries, and drivers.

The compute circuitry 402 is communicatively coupled to other components of the compute node 400 via the I/O subsystem 408, which may be embodied as circuitry and/or components to facilitate input/output operations with the compute circuitry 402 (e.g., with the processor 404 and/or the main memory 406) and other components of the compute circuitry 402. For example, the I/O subsystem 408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 408 may form a portion of a system-on-a-chip (SoC) and be incorporated, along with one or more of the processor 404, the memory 406, and other components of the compute circuitry 402, into the compute circuitry 402.

The one or more illustrative data storage devices 410 may be embodied as any type of devices configured for short-term or long-term storage of data such as, for example, memory devices and circuits, memory cards, hard disk drives, solid-state drives, or other data storage devices. Individual data storage devices 410 may include a system partition that stores data and firmware code for the data storage device 410. Individual data storage devices 410 may also include one or more operating system partitions that store data files and executables for operating systems depending on, for example, the type of compute node 400.

The communication circuitry 412 may be embodied as any communication circuit, device, or collection thereof, capable of enabling communications over a network between the compute circuitry 402 and another compute device (e.g., an edge gateway of an implementing edge computing system). The communication circuitry 412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 412 includes a network interface controller (NIC) 420, which may also be referred to as a host fabric interface (HFI). The NIC 420 may be embodied as one or more add-in-boards, daughter cards, network interface cards, controller chips, chipsets, or other devices that may be used by the compute node 400 to connect with another compute device (e.g., an edge gateway node). In some examples, the NIC 420 may be embodied as part of a system-on-a-chip (SoC) that includes one or more processors, or included on a multichip package that also contains one or more processors. In some examples, the NIC 420 may include a local processor (not shown) and/or a local memory (not shown) that are both local to the NIC 420. In such examples, the local processor of the NIC 420 may be capable of performing one or more of the functions of the compute circuitry 402 described herein. Additionally, or alternatively, in such examples, the local memory of the NIC 420 may be integrated into one or more components of the client compute node at the board level, socket level, chip level, and/or other levels.

Additionally, in some examples, a respective compute node 400 may include one or more peripheral devices 414. Such peripheral devices 414 may include any type of peripheral device found in a compute device or server such as audio input devices, a display, other input/output devices, interface devices, and/or other peripheral devices, depending on the particular type of the compute node 400. In further examples, the compute node 400 may be embodied by a respective edge compute node (whether a client, gateway, or aggregation node) in an edge computing system or like forms of appliances, computers, subsystems, circuitry, or other components.

Figure 4B:
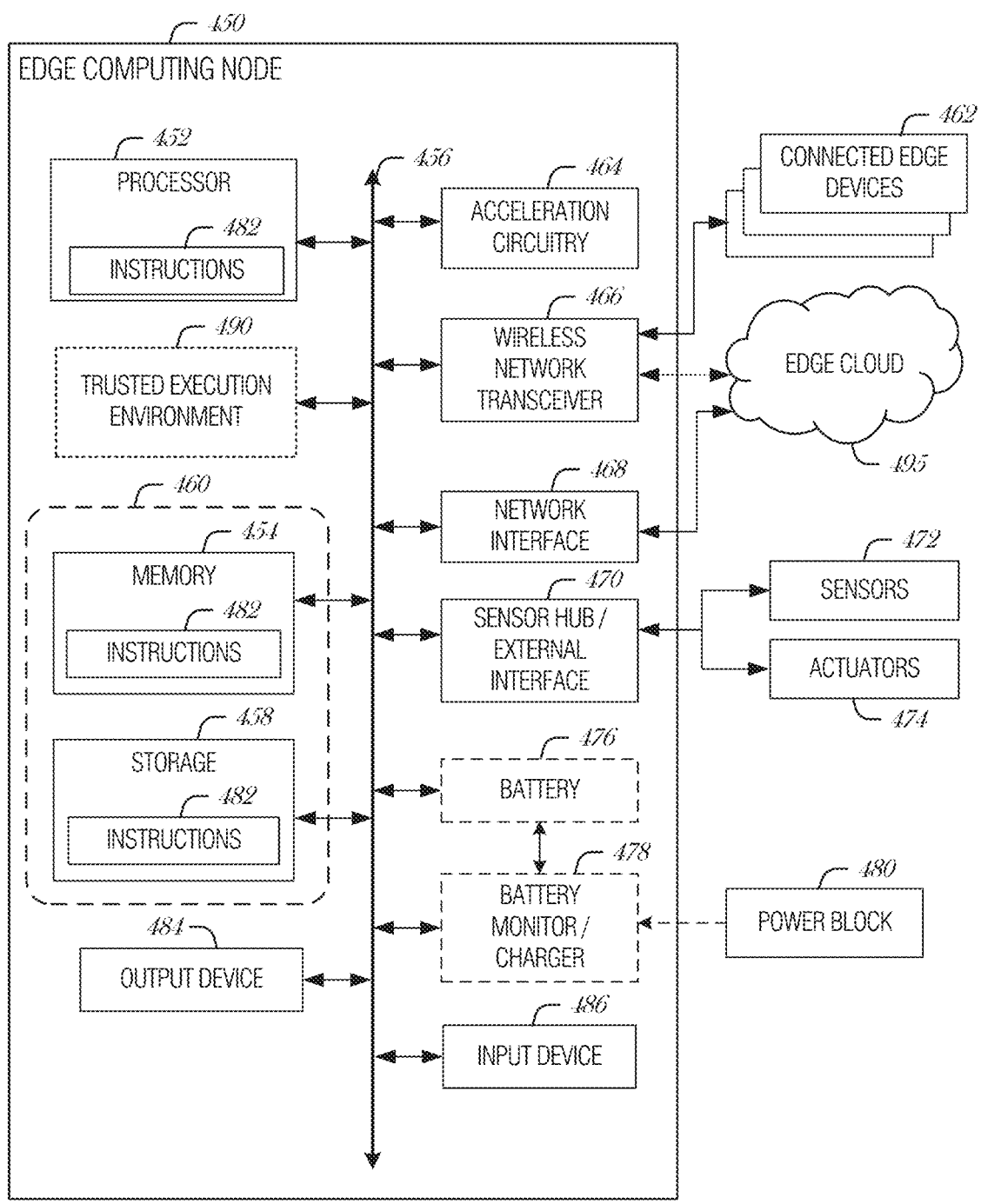
FIG. 4B provides a further overview of example components within a computing device in an edge computing system.

In a more detailed example, FIG. 4B illustrates a block diagram of an example of components that may be present in an edge computing node 450 for implementing the techniques (e.g., operations, processes, methods, and methodologies) described herein. This edge computing node 450 provides a closer view of the respective components of node 400 when implemented as or as part of a computing device (e.g., as a mobile device, a base station, server, gateway, etc.). The edge computing node 450 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 450, or as components otherwise incorporated within a chassis of a larger system.

The edge computing node 450 may include processing circuitry in the form of a processor 452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 452 may be a part of a system on a chip (SoC) in which the processor 452 and other components are formed into a single integrated circuit, or a single package, such as the Edison™ or Galileo™ SoC boards from Intel Corporation, Santa Clara, California. As an example, the processor 452 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 452 and accompanying circuitry may be provided in a single socket form factor, multiple socket form factor, or a variety of other formats, including in limited hardware configurations or configurations that include fewer than all elements shown in FIG. 4B.

The processor 452 may communicate with a system memory 454 over an interconnect 456 (e.g., a bus). Any number of memory devices may be used to provide for a given amount of system memory. As examples, the memory 454 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example, the storage 458 may be implemented via a solid-state disk drive (SSDD). Other devices that may be used for the storage 458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 456 may couple the processor 452 to a transceiver 466, for communications with the connected edge devices 462. The transceiver 466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 466 (or multiple transceivers) may communicate using multiple standards or radios for communications at a different range. For example, the edge computing node 450 may communicate with close devices, e.g., within about 10 meters, using a local transceiver based on Bluetooth Low Energy (BLE), or another low power radio, to save power. More distant connected edge devices 462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 466 (e.g., a radio transceiver) may be included to communicate with devices or services in a cloud (e.g., an edge cloud 495) via local or wide area network protocols. The wireless network transceiver 466 may be a low-power wide-area (LPWA) transceiver that follows the IEEE 802.15.4, or IEEE 802.15.4g standards, among others. The edge computing node 450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 466, as described herein. For example, the transceiver 466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 468 may be included to provide a wired communication to nodes of the edge cloud 495 or to other devices, such as the connected edge devices 462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to enable connecting to a second network, for example, a first NIC 468 providing communications to the cloud over Ethernet, and a second NIC 468 providing communications to other devices over another type of network.

Given the variety of types of applicable communications from the device to another component or network, applicable communications circuitry used by the device may include or be embodied by any one or more of components 464, 466, 468, or 470. Accordingly, in various examples, applicable means for communicating (e.g., receiving, transmitting, etc.) may be embodied by such communications circuitry.

The edge computing node 450 may include or be coupled to acceleration circuitry 464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 456 may couple the processor 452 to a sensor hub or external interface 470 that is used to connect additional devices or subsystems. The devices may include sensors 472, such as accelerometers, level sensors, flow sensors, optical light sensors, camera sensors, temperature sensors, global navigation system (e.g., GPS) sensors, pressure sensors, barometric pressure sensors, and the like. The hub or interface 470 further may be used to connect the edge computing node 450 to actuators 474, such as power switches, valve actuators, an audible sound generator, a visual warning device, and the like.

In some optional examples, various input/output (I/O) devices may be present within or connected to, the edge computing node 450. For example, a display or other output device 484 may be included to show information, such as sensor readings or actuator position. An input device 486, such as a touch screen or keypad may be included to accept input. An output device 484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 450. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 476 may power the edge computing node 450, although, in examples in which the edge computing node 450 is mounted in a fixed location, it may have a power supply coupled to an electrical grid, or the battery may be used as a backup or for temporary capabilities. The battery 476 may be a lithium ion battery, or a metal-air battery, such as a zinc-air battery, an aluminum-air battery, a lithium-air battery, and the like.

A battery monitor/charger 478 may be included in the edge computing node 450 to track the state of charge (SoCh) of the battery 476, if included. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, Texas. The battery monitor/charger 478 may communicate the information on the battery 476 to the processor 452 over the interconnect 456. The battery monitor/charger 478 may also include an analog-to-digital (ADC) converter that enables the processor 452 to directly monitor the voltage of the battery 476 or the current flow from the battery 476. The battery parameters may be used to determine actions that the edge computing node 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the edge computing node 450. A wireless battery charging circuit, such as an LTC4020 chip from Linear Technologies of Milpitas, California, among others, may be included in the battery monitor/charger 478. The specific charging circuits may be selected based on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine-readable medium 460 including code to direct the processor 452 to perform electronic operations in the edge computing node 450. The processor 452 may access the non-transitory, machine-readable medium 460 over the interconnect 456. For instance, the non-transitory, machine-readable medium 460 may be embodied by devices described for the storage 458 or may include specific storage units such as optical disks, flash drives, or any number of other hardware devices. The non-transitory, machine-readable medium 460 may include instructions to direct the processor 452 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also, in a specific example, the instructions 482 on the processor 452 (separately, or in combination with the instructions 482 of the machine readable medium 460) may configure execution or operation of a trusted execution environment (TEE) 490. In an example, the TEE 490 operates as a protected area accessible to the processor 452 for secure execution of instructions and secure access to data. Various implementations of the TEE 490, and an accompanying secure area in the processor 452 or the memory 454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the node 450 through the TEE 490 and the processor 452.

Figure 5:
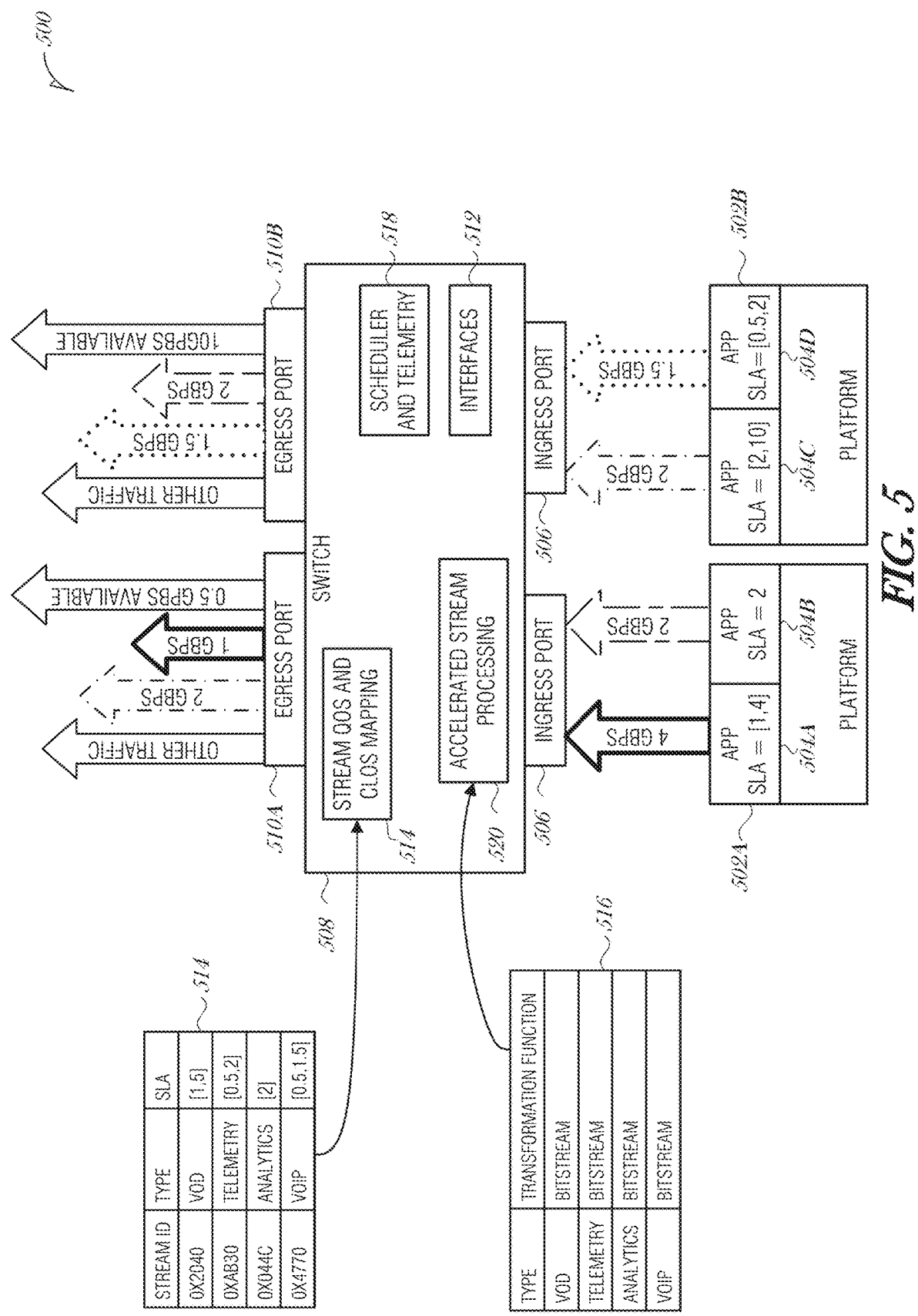
FIG. 5 is a block diagram illustrating control and data flow in an operational environment, according to an embodiment.

FIG. 5 is a block diagram illustrating control and data flow in an operational environment 500, according to an embodiment. The environment 500 includes multiple platforms 502A, 502B (collectively referred to as 502). The platforms may be hardware or systems operated by content delivery providers, cloud service providers, or the like. Each platform 500 hosts one or more applications 504A, 504B, 504C, 504D (collectively referred to as 504). The applications 504 certain data stream types, such as content delivery network (CDN) data stream, analytics data stream, telemetry data stream, or the like. Streams are illustrated using different dashed or bolded lines to illustrate the stream on the ingress port and corresponding output stream on the egress port.

Additionally, the applications 504 each have a service level agreement (SLA). In the example illustrated in FIG. 5, the SLA is expressed as a bandwidth requirement, such as may be measured in gigabits per second (Gbps). The SLA is denoted using a range, e.g., a range of two to four Gbps is denoted as [2,4]. A fixed value may be used as the SLA, such as an SLA=2. In this case, the application requires a constant, or near constant, bandwidth allocation of 2 Gbps. The applications 504 produce the data streams, which are received at the ingress ports 506 of the switch 508. The data streams are destined to one or more recipients and the switch 508 transmits the data streams to the egress port 510A, 510B (collectively referred to as 510) toward the data consumer.

The platforms 502 may access the switch 508 and register the data streams using an interface 512. Two interfaces 512 are includes in the present example: one for registering data streams and one for registering transformation functions.

The first interface to register data streams allows the platform or other entity to register data stream information such as the data stream identifier, the data stream type, and SLA (QoS or class of service (Clos)) information. This information is stored in stream data store 514. Specifically, data stream information may include the identifier (ID) of a particular stream. The streams going through the switch have unique IDs that can be mapped to the application. The data stream information may also include the type of data that is part of the stream. This information has to match to the type of data transformations registered in the switch. The data stream information also include the SLA associated to the stream, such as [MIN and MAX] bandwidth that is required for that stream. Note that other ways to specify the SLA can be allowed. For instance, packets in a data stream flow may be latency sensitive. Hence, the SLA may operate with lower bandwidth requirements but require low latency. Thus, the SLA may be expressed in terms of latency, round trip time, response time, or the like.

The interfaces 512 may expose an application programming interface (API) and require authentication by the platform to register the stream.

Another interface 512 may be used to register the transformation functions. The transformation information is stored in transformation data store 516. These transformation functions are then available on the switch 508 to transform data streams of specific types, according to the type of transformation function available. An API may be exposed to register the transformation function where the platform 502 or other entity provides the type of stream associated with the transformation function, the transformation function itself, and the amount of data reduction that the transformation function can achieve.

A transform function takes input data and then turns it into new data (i.e., transformed data). The transformation function may use one or more mathematical, bitwise, logical, or other operations that render the transformed data materially different than the input data.

Stream types may have unique identifiers. Stream types may include video on demand (VOD), telemetry, analytics, voice over IP (VOIP), and the like.

The transformation function may be in a form of a bitstream. A bitstream is a binary sequence, which may be used to configure, program, or modify a programmable circuit, such as an FPGA. For example, the term bitstream is used to describe the configuration data to be loaded into a field-programmable gate array (FPGA). Although most FPGAs also support a byte-parallel loading method as well, this usage may have originated based on the common method of configuring the FPGA from a serial bit stream, typically from a serial PROM or flash memory chip. The detailed format of the bitstream for a particular FPGA is typically proprietary to the FPGA vendor.

Multiple transformation functions may be mapped to a data stream type. Further, multiple transformation functions may be applied to a single data stream in order to compound data reduction.

The transformation function may be used to compress, downsample, filter, or otherwise reduce the bitrate or bandwidth of a data stream. For instance, a data stream may be used to transmit video in 4K resolution (e.g., 4096×2160 pixels). A transformation function may be used to reduce the resolution to 1K (e.g., 1024×768 pixels).

Additionally, the transformation function may be used to compress the data stream. Data compressed using lossless data compression algorithms are fully recoverable and perfectly reconstructed when decompressed. In contrast, lossy data compression only allows for an approximation of the original data when decompressed. The transformation function may implement one or more of several types of lossless compression algorithms, including but not limited to H.264 lossless (e.g., ×264), H.265 lossless (e.g., ×265), Motion JPEG 2000 lossless, or the like. Alternatively, a lossy data compression standard may be used.

The switch 508 monitors the egress ports 510 using the scheduling and telemetry circuitry 518. The egress port 510 may transmit traffic from other sources. There is a maximum data throughput of an egress port 510. Remaining bandwidth is illustrated in FIG. 5. If bandwidth of an egress port 510 is saturated or close to saturated, such that the utilization is over a threshold amount or the remaining bandwidth is under a threshold amount, then the scheduling and telemetry circuitry 518 may attempt to transform one or more streams being transmitted on the egress port 510 in order to reduce data flow through the egress port 510.

The scheduling and telemetry circuitry 518 first identifies the streams being output on the egress port 510. The scheduling and telemetry circuitry 518 may then lookup stream data using the stream identifier and referencing the stream data store 514. The scheduling and telemetry circuitry 518 is then able to determine whether there are any transformation functions for the types of data streams identified. This is performed by performing a lookup on the transformation data store 516 using the stream type identifier. If there are transformation functions available for streams that are being output on the egress port 510, then the scheduling and telemetry circuitry 518 may interface with the accelerated stream processing circuitry 520 to process one or more streams with one or more transformation functions to reduce data flow through the egress port 510. Continued telemetry provides insight into whether additional stream processing is needed on the egress port 510 to maintain optimum utilization of the port while concurrently satisfying QoS or CloS of the streams being output on the port.

In the example illustrated, the application 504A is a content delivery network (CDN) that has an SLA=[1,4] and is delivering a 4K video stream to switch 508. The video stream is being transmitted out on egress port 510A. If there is congestion detected at the egress port 510A, then one or more streams being output on egress port 510A may be transformed to reduce saturation on the egress given the amount of remaining bandwidth available is close to zero. As an example, the traffic coming from the CDN server application 504A is transformed from 4K resolution to 1K resolution in an inline fashion with accelerated stream processing 520. The input stream and output stream are illustrated with bold lines in FIG. 5. In various embodiments, every different stream type may have different transformation functions.

Figure 6:
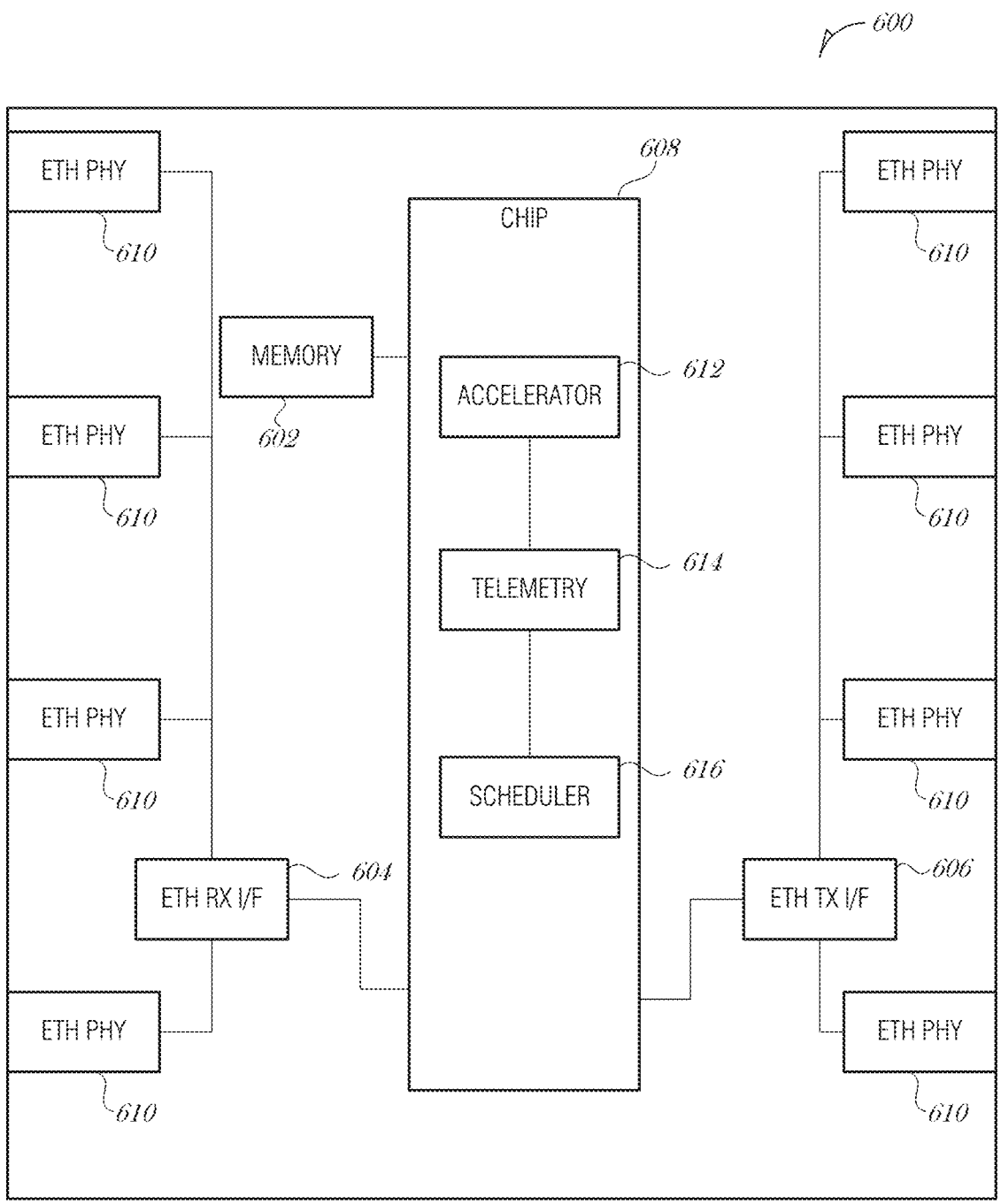
FIG. 6 is a block diagram illustrating a system for implementing switch-based adaptive transformation for edge appliances, according to an embodiment.

FIG. 6 is a block diagram illustrating a system 600 for implementing switch-based adaptive transformation for edge appliances, according to an embodiment. The system 600 may represent a network switch or be one or more components of a network switch. A network switch is used to route data traffic from one compute device or peripheral device to another compute device or peripheral device. Where a network hub is used to transmit the same data from an input port (ingress port) to all output ports (egress ports), a switch (also referred to as a switching hub, bridging hub, or MAC (media access control) bridge) sends data only to those devices required by each operation.

The system 600 includes various components, some or all of which may be on the same printed circuit board or substrate. Components include, but are not limited to, memory device 602, Ethernet receive (RX) interface 604, and Ethernet transmit (TX) interface 606, which are coupled to a chip 608.

Ethernet RX interface 604 is connected to one or more Ethernet physical layer interfaces (ETH PHY) 610, which may be RJ45 jacks. RJ45 is an 8-pin/8-position plug or jack that is commonly used to connect computers in Ethernet-based networks. Ethernet RX interface 604 may be configured to parallelize the serial communication received over the ETH PHY 610. The Ethernet RX interface 604 may also perform other ingress processing, such as packet classification, lookup, or queuing.

The Ethernet TX interface 606 is coupled to one or more ETH PHY 610 and handles egress processing. The Ethernet TX interface 606 may serialize data for transfer over the ETH PHY 610. The Ethernet TX interface 606 may perform other egress processing, such as egress filtering, output queue management, or MAC lookups.

Memory device 602 may be volatile memory (e.g., dynamic random access memory—DRAM) or non-volatile memory, such as flash memory (e.g., electrically-erasable read-only memory—EEPROM, NAND Flash, NOR Flash, etc.). Memory 602 may be used to store instructions to perform the various operations described herein. Memory 602 may also be used to store stream data or transformation function data such as described above with respect to stream data store 514 and transformation data store 516.

The chip 608 may include one or more microprocessors, digital signal processors, etc. Chip 608 may contain one or more processing cores, each of which has one or more arithmetic logic units (ALU), instruction fetch units, instruction decode units, control units, registers, data stack pointers, program counters, and other essential components according to the particular architecture of the processor. As an illustrative example, chip 608 may be a system on chip (SOC) that includes multiple intellectual property (IP) blocks or IP cores. Chip 608 may include an x86-type of processor, which may be implemented as one of the IP blocks.

The system 600 is understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entities may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

As discussed, the chip 608 may have several intellectual property (IP) blocks. IP blocks may be independent processing circuitry or reusable logic for a designated purpose. The chip 608 is able to selectively provide power to an IP block depending configuration data, state data, or other control signals.

IP blocks included on the chip 608 may include an accelerator IP block 612, telemetry IP block 614, and scheduler IP block 616. It is understood that the IP blocks may be implemented in one or more separate chips. Further, it is understood that IP blocks may be referred to as circuitry, circuits, processing circuitry, or processing circuits. IP blocks may include their own memory, instructions, processors, comparators, adders, subtractors, transistors, and other digital circuit components to provide general processing support or specific application tasks, depending on the design of the IP block.

Accelerator IP block 612 is used to apply stream transformation functions to data streams. The accelerator IP block 612 may be implemented as an FPGA and be reconfigurable based on a transformation bitstream. Telemetry IP block 614 is used to monitor egress ports (e.g., ETH PHY 610) of the network switch.

Scheduler IP block 616 interfaces with the telemetry IP block 614 and receives telemetry data from the telemetry IP block 614 to determine that a utilization of egress ports of the network switch is over a threshold utilization. Utilization may refer to bandwidth, latency, or the like. In an embodiment, the threshold utilization is an amount of kilobits per second. In other embodiments, the threshold utilization may be expressed as a percentage of total potential utilization. When the utilization is over the threshold, the scheduler IP block 616 determines a selected data stream of the plurality of data streams to transform and the uses the accelerator IP block 612 to transform the selected data stream to produce a transformed data stream, while ensuring that the transformed data stream complies with a corresponding stream SLA. The scheduler IP block 616 then interfaces with the Ethernet TX interface 606 to transmit the transformed data stream on an egress port.

In an embodiment, the threshold utilization is based on types of stream traffic being serviced by the network switch.

Various types of transformation functions may be supported by the system 600. In various embodiments, the stream transformation functions include a bitstream function, a downsampling function, a compression function, or a filtering function.

In an embodiment, the telemetry IP block 614 is to calculate and store a data rate transmitted through egress ports of the network switch.

In an embodiment, to determine the selected data stream, the scheduler IP block 616 is to iterate through the plurality of data streams to analyze each subject data stream in the plurality of data streams. For each stream, the scheduler IP block 616 can determine whether a subject data stream is transformable and then determine the selected data stream as the subject data stream that is transformable. In a further embodiment, the scheduler IP block 616 is to continue iterating through the plurality of data streams to determine whether another data stream is transformable. In a further embodiment, the scheduler IP block 616 is to abort iterating through the plurality of data streams when the transformation of a subject data stream reduces the utilization of the egress ports under the threshold utilization.

In an embodiment, determining whether the subject data stream is transformable includes looking up a stream traffic type based on a stream identifier of the subject data stream and determining whether a transformation function is available for the stream traffic type. In an embodiment, determining whether the subject data stream is transformable includes looking up a stream SLA based on a stream identifier of the subject data stream and determining whether a current level of service is able to be reduced based on the stream SLA. In another related embodiment, the subject data stream has to have an available transformation function and also be reducible based on the SLA to be considered for stream transformation.

In an embodiment, when the scheduler IP block 616 uses the accelerator IP block 612 to transform the selected data stream, the scheduler IP block 616 may use or apply a plurality of transformation functions to the selected data stream. The transformation functions may be applied serially or in parallel.

Figure 7:
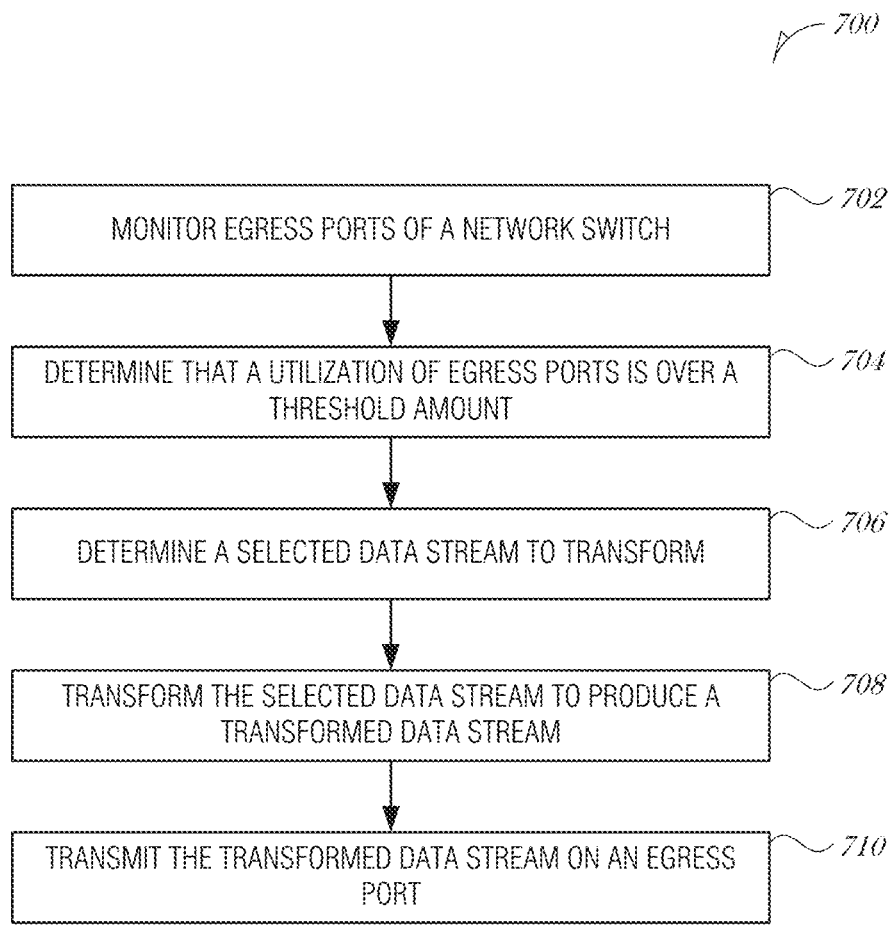
FIG. 7 is a flowchart illustrating a method for implementing switch-based adaptive transformations on a network switch, according to an embodiment.

FIG. 7 is a flowchart illustrating a method 700 for implementing switch-based adaptive transformations on a network switch, according to an embodiment. The method 700 may be performed by a device, such as system 600, or another system, such as an edge node 450.

At 702, egress ports of the network switch are monitored.

At 704, it is determined that a utilization of egress ports of the network switch is over a threshold utilization. In an embodiment, the threshold utilization is based on types of stream traffic being serviced by the network switch. In an embodiment, the threshold utilization is an amount of kilobits per second, which is less than the total potential bandwidth.

At 706, a selected data stream of the plurality of data streams to transform is determined.

At 708, the selected data stream is transformed with a stream transformation function to produce a transformed data stream, wherein the transformed data stream complies with a corresponding stream SLA. In an embodiment, the stream transformation function includes a bitstream function. In a related embodiment, the stream transformation function includes a downsampling function. In a related embodiment, the stream transformation function includes a compression function. In a related embodiment, the stream transformation function includes a filtering function.

In an embodiment, determining the selected data stream, includes iterating through the plurality of data streams to analyze each subject data stream in the plurality of data streams, determining whether a subject data stream is transformable, and determining the selected data stream as the subject data stream that is transformable. In a further embodiment, the method 700 includes continuing to iterate through the plurality of data streams to determine whether another data stream is transformable. In a further embodiment, the method 700 includes aborting iterating through the plurality of data streams when the transformation of a subject data stream reduces the utilization of the egress ports under the threshold utilization.

In an embodiment, determining whether the subject data stream is transformable, includes looking up a stream traffic type based on a stream identifier of the subject data stream and determining whether a transformation function is available for the stream traffic type. In an embodiment, determining whether the subject data stream is transformable, includes looking up a stream SLA based on a stream identifier of the subject data stream and determining whether a current level of service is able to be reduced based on the stream SLA. In another related embodiment, the subject data stream has to have an available transformation function and also be reducible based on the SLA to be considered for stream transformation.

At 710, the transformed data stream is transmitted on an egress port. In an embodiment, transforming the selected data stream includes applying a plurality of transformation functions to the selected data stream.

In an embodiment, the method 700 includes calculating and storing a data rate transmitted through egress ports of the network switch.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Figure 8:
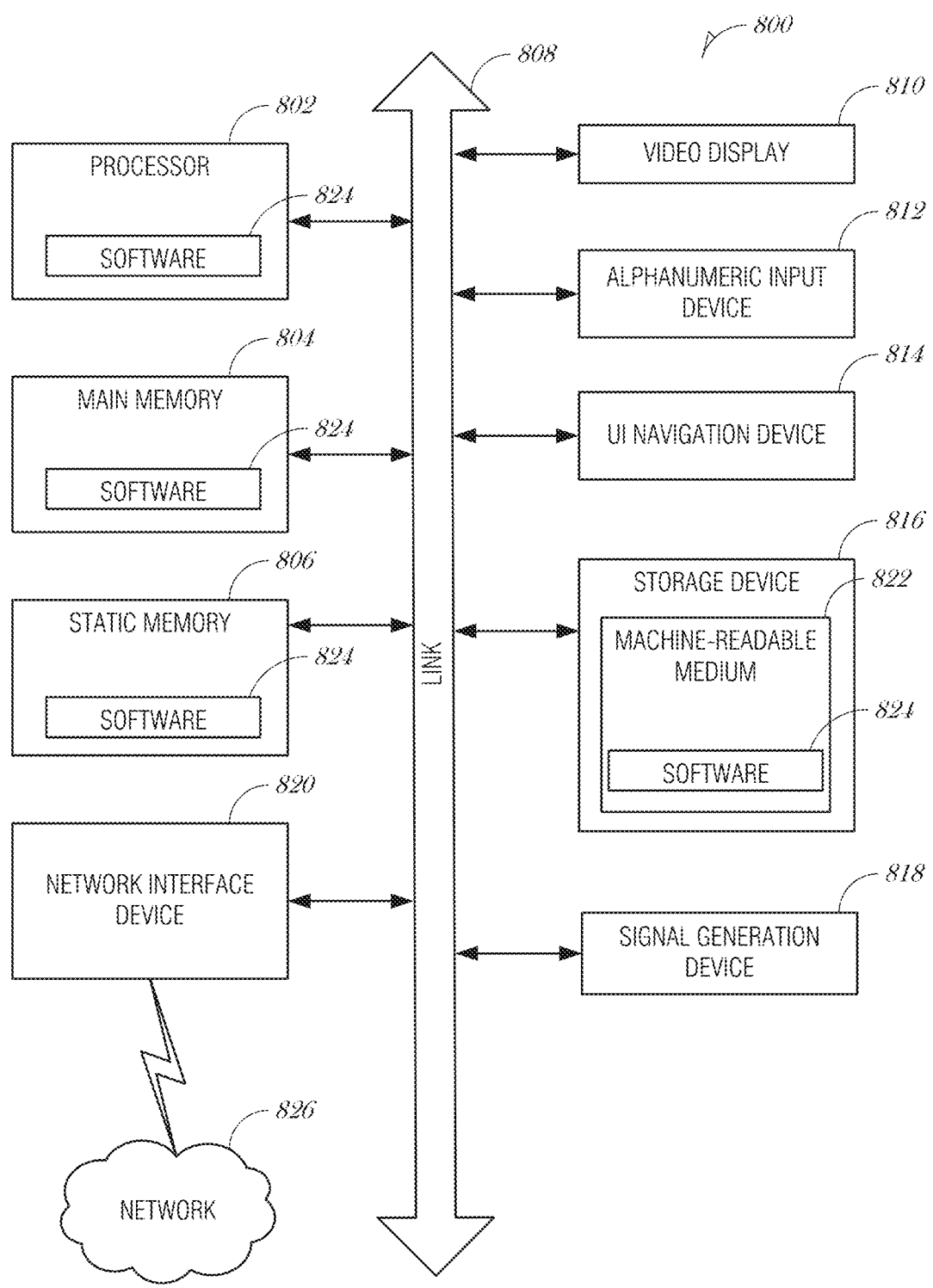
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a network switch for implementing switch-based adaptive transformations, comprising: a memory device to store a stream information of a plurality of data streams being handled by the network switch, the stream information including a stream identifier, a stream service level agreement (SLA), and a stream traffic type; accelerator circuitry to apply stream transformation functions to data streams; telemetry circuitry to monitor egress ports of the network switch; and scheduler circuitry to: receive telemetry data from the telemetry circuitry to determine that a utilization of egress ports of the network switch is over a threshold utilization; determine a selected data stream of the plurality of data streams to transform; use the accelerator circuitry to transform the selected data stream to produce a transformed data stream, wherein the transformed data stream complies with a corresponding stream SLA; and transmit the transformed data stream on an egress port.

In Example 2, the subject matter of Example 1 includes, wherein the threshold utilization is based on types of stream traffic being serviced by the network switch.

In Example 3, the subject matter of Examples 1-2 includes, wherein the threshold utilization is an amount of kilobits per second.

In Example 4, the subject matter of Examples 1-3 includes, wherein the stream transformation functions include a bitstream function.

In Example 5, the subject matter of Examples 1-4 includes, wherein the stream transformation functions include a downsampling function.

In Example 6, the subject matter of Examples 1-5 includes, wherein the stream transformation functions include a compression function.

In Example 7, the subject matter of Examples 1-6 includes, wherein the stream transformation functions include a filtering function.

In Example 8, the subject matter of Examples 1-7 includes, wherein the telemetry circuitry is to calculate and store a data rate transmitted through egress ports of the network switch.

In Example 9, the subject matter of Examples 1-8 includes, wherein to determine the selected data stream, the scheduler circuitry is to: iterate through the plurality of data streams to analyze each subject data stream in the plurality of data streams; determine whether a subject data stream is transformable; and determine the selected data stream as the subject data stream that is transformable.

In Example 10, the subject matter of Example 9 includes, wherein to determine whether the subject data stream is transformable, the scheduler circuitry is to: look up in the memory device, a stream traffic type based on a stream identifier of the subject data stream; and determine whether a transformation function is available for the stream traffic type.

In Example 11, the subject matter of Examples 9-10 includes, wherein to determine whether the subject data stream is transformable, the scheduler circuitry is to: look up in the memory device, a stream SLA based on a stream identifier of the subject data stream; and determine whether a current level of service is able to be reduced based on the stream SLA.

In Example 12, the subject matter of Examples 9-11 includes, wherein the scheduler circuitry is to continue iterating through the plurality of data streams to determine whether another data stream is transformable.

In Example 13, the subject matter of Example 12 includes, wherein the scheduler circuitry is to abort iterating through the plurality of data streams when the transformation of a subject data stream reduces the utilization of the egress ports under the threshold utilization.

In Example 14, the subject matter of Examples 1-13 includes, wherein to use accelerator circuitry to transform the selected data stream includes applying a plurality of transformation functions to the selected data stream.

Example 15 is a method for implementing switch-based adaptive transformations on a network switch, comprising: monitoring egress ports of the network switch; determining that a utilization of egress ports of the network switch is over a threshold utilization; determining a selected data stream of the plurality of data streams to transform; transforming the selected data stream with a stream transformation function to produce a transformed data stream, wherein the transformed data stream complies with a corresponding stream SLA; and transmitting the transformed data stream on an egress port.

In Example 16, the subject matter of Example 15 includes, wherein the threshold utilization is based on types of stream traffic being serviced by the network switch.

In Example 17, the subject matter of Examples 15-16 includes, wherein the threshold utilization is an amount of kilobits per second.

In Example 18, the subject matter of Examples 15-17 includes, wherein the stream transformation function includes a bitstream function.

In Example 19, the subject matter of Examples 15-18 includes, wherein the stream transformation function includes a downsampling function.

In Example 20, the subject matter of Examples 15-19 includes, wherein the stream transformation function includes a compression function.

In Example 21, the subject matter of Examples 15-20 includes, wherein the stream transformation function includes a filtering function.

In Example 22, the subject matter of Examples 15-21 includes, calculating and storing a data rate transmitted through egress ports of the network switch.

In Example 23, the subject matter of Examples 15-22 includes, wherein determining the selected data stream, comprises: iterating through the plurality of data streams to analyze each subject data stream in the plurality of data streams; determining whether a subject data stream is transformable; and determining the selected data stream as the subject data stream that is transformable.

In Example 24, the subject matter of Example 23 includes, determining whether the subject data stream is transformable, comprises: looking up a stream traffic type based on a stream identifier of the subject data stream; and determining whether a transformation function is available for the stream traffic type.

In Example 25, the subject matter of Examples 23-24 includes, determining whether the subject data stream is transformable, comprises: looking up a stream SLA based on a stream identifier of the subject data stream; and determining whether a current level of service is able to be reduced based on the stream SLA.

In Example 26, the subject matter of Examples 23-25 includes, continuing to iterate through the plurality of data streams to determine whether another data stream is transformable.

In Example 27, the subject matter of Example 26 includes, aborting iterating through the plurality of data streams when the transformation of a subject data stream reduces the utilization of the egress ports under the threshold utilization.

In Example 28, the subject matter of Examples 15-27 includes, wherein transforming the selected data stream includes applying a plurality of transformation functions to the selected data stream.

Example 29 is at least one machine-readable medium including instructions for implementing switch-based adaptive transformations on a network switch, which when executed by a machine, cause the machine to perform operations comprising: monitoring egress ports of the network switch; determine that a utilization of egress ports of the network switch is over a threshold utilization: determining a selected data stream of the plurality of data streams to transform; transforming the selected data stream to produce a transformed data stream, wherein the transformed data stream complies with a corresponding stream SLA; and transmitting the transformed data stream on an egress port.

In Example 30, the subject matter of Example 29 includes, wherein the threshold utilization is based on types of stream traffic being serviced by the network switch.

In Example 31, the subject matter of Examples 29-30 includes, wherein the threshold utilization is an amount of kilobits per second.

In Example 32, the subject matter of Examples 29-31 includes, wherein the stream transformation function includes a bitstream function.

In Example 33, the subject matter of Examples 29-32 includes, wherein the stream transformation function includes a downsampling function.

In Example 34, the subject matter of Examples 29-33 includes, wherein the stream transformation function includes a compression function.

In Example 35, the subject matter of Examples 29-34 includes, wherein the stream transformation function includes a filtering function.

In Example 36, the subject matter of Examples 29-35 includes, operations of calculating and storing a data rate transmitted through egress ports of the network switch.

In Example 37, the subject matter of Examples 29-36 includes, wherein determining the selected data stream, comprises: iterating through the plurality of data streams to analyze each subject data stream in the plurality of data streams; determining whether a subject data stream is transformable; and determining the selected data stream as the subject data stream that is transformable.

In Example 38, the subject matter of Example 37 includes, wherein determining whether the subject data stream is transformable, comprises: looking up a stream traffic type based on a stream identifier of the subject data stream; and determining whether a transformation function is available for the stream traffic type.

In Example 39, the subject matter of Examples 37-38 includes, wherein determining whether the subject data stream is transformable, comprises: looking up a stream SLA based on a stream identifier of the subject data stream;

and determining whether a current level of service is able to be reduced based on the stream SLA.

In Example 40, the subject matter of Examples 37-39 includes, operations of continuing to iterate through the plurality of data streams to determine whether another data stream is transformable.

In Example 41, the subject matter of Example 40 includes, operations of aborting iterating through the plurality of data streams when the transformation of a subject data stream reduces the utilization of the egress ports under the threshold utilization.

In Example 42, the subject matter of Examples 29-41 includes, wherein transforming the selected data stream includes applying a plurality of transformation functions to the selected data stream.

Example 43 is an apparatus for implementing switch-based adaptive transformations on a network switch, comprising: means for monitoring egress ports of the network switch; means for determining that a utilization of egress ports of the network switch is over a threshold utilization; means for determining a selected data stream of the plurality of data streams to transform; means for transforming the selected data stream to produce a transformed data stream, wherein the transformed data stream complies with a corresponding stream SLA; and means for transmitting the transformed data stream on an egress port.

In Example 44, the subject matter of Example 43 includes, wherein the threshold utilization is based on types of stream traffic being serviced by the network switch.

In Example 45, the subject matter of Examples 43-44 includes, wherein the threshold utilization is an amount of kilobits per second.

In Example 46, the subject matter of Examples 43-45 includes, wherein the stream transformation function includes a bitstream function.

In Example 47, the subject matter of Examples 43-46 includes, wherein the stream transformation function includes a downsampling function.

In Example 48, the subject matter of Examples 43-47 includes, wherein the stream transformation function includes a compression function.

In Example 49, the subject matter of Examples 43-48 includes, wherein the stream transformation function includes a filtering function.

In Example 50, the subject matter of Examples 43-49 includes, means for calculating and storing a data rate transmitted through egress ports of the network switch.

In Example 51, the subject matter of Examples 43-50 includes, wherein the means for determining the selected data stream, comprise means for: iterating through the plurality of data streams to analyze each subject data stream in the plurality of data streams; determining whether a subject data stream is transformable; and determining the selected data stream as the subject data stream that is transformable.

In Example 52, the subject matter of Example 51 includes, wherein the means for determining whether the subject data stream is transformable, comprise means for: looking up a stream traffic type based on a stream identifier of the subject data stream; and determining whether a transformation function is available for the stream traffic type.

In Example 53, the subject matter of Examples 51-52 includes, wherein the means for determining whether the subject data stream is transformable, comprise means for: looking up a stream SLA based on a stream identifier of the subject data stream; and determining whether a current level of service is able to be reduced based on the stream SLA.

In Example 54, the subject matter of Examples 51-53 includes, means for continuing to iterate through the plurality of data streams to determine whether another data stream is transformable.

In Example 55, the subject matter of Example 54 includes, means for aborting iterating through the plurality of data streams when the transformation of a subject data stream reduces the utilization of the egress ports under the threshold utilization.

In Example 56, the subject matter of Examples 43-55 includes, wherein the means for transforming the selected data stream includes means for applying a plurality of transformation functions to the selected data stream.

Example 57 is a network switch for implementing switch-based adaptive transformations, comprising: a memory device to store a stream information of a plurality of data streams being handled by the network switch, the stream information including a stream identifier, a stream service level agreement (SLA), and a stream traffic type; and processing circuitry to: monitor egress ports of the network switch; determine that a utilization of egress ports of the network switch is over a threshold utilization; determine a selected data stream of the plurality of data streams to transform; transform the selected data stream to produce a transformed data stream, wherein the transformed data stream complies with a corresponding stream SLA; and transmit the transformed data stream on an egress port.

In Example 58, the subject matter of Example 57 includes, wherein the threshold utilization is based on types of stream traffic being serviced by the network switch.

In Example 59, the subject matter of Examples 57-58 includes, wherein the threshold utilization is an amount of kilobits per second.

In Example 60, the subject matter of Examples 57-59 includes, wherein the stream transformation function includes a bitstream function.

In Example 61, the subject matter of Examples 57-60 includes, wherein the stream transformation function includes a downsampling function.

In Example 62, the subject matter of Examples 57-61 includes, wherein the stream transformation function includes a compression function.

In Example 63, the subject matter of Examples 57-62 includes, wherein the stream transformation function includes a filtering function.

In Example 64, the subject matter of Examples 57-63 includes, operations of calculating and storing a data rate transmitted through egress ports of the network switch.

In Example 65, the subject matter of Examples 57-64 includes, wherein determining the selected data stream, comprises: iterating through the plurality of data streams to analyze each subject data stream in the plurality of data streams; determining whether a subject data stream is transformable; and determining the selected data stream as the subject data stream that is transformable.

In Example 66, the subject matter of Example 65 includes, wherein determining whether the subject data stream is transformable, comprises: looking up a stream traffic type based on a stream identifier of the subject data stream; and determining whether a transformation function is available for the stream traffic type.

In Example 67, the subject matter of Examples 65-66 includes, wherein determining whether the subject data stream is transformable, comprises: looking up a stream SLA based on a stream identifier of the subject data stream;

and determining whether a current level of service is able to be reduced based on the stream SLA.

In Example 68, the subject matter of Examples 65-67 includes, operations of continuing to iterate through the plurality of data streams to determine whether another data stream is transformable.

In Example 69, the subject matter of Example 68 includes, operations of aborting iterating through the plurality of data streams when the transformation of a subject data stream reduces the utilization of the egress ports under the threshold utilization.

In Example 70, the subject matter of Examples 57-69 includes, wherein transforming the selected data stream includes applying a plurality of transformation functions to the selected data stream.

Example 72 is an edge computing system, comprising a plurality of edge computing nodes, the plurality of edge computing nodes configured with the biometric security methods of any of the examples of 1-71.

Example 73 is an edge computing node, operable in an edge computing system, comprising processing circuitry configured to implement any of the examples of 1-71.

Example 74 is an edge computing node, operable as a server in an edge computing system, configured to perform any of the examples of 1-71.

Example 75 is an edge computing node, operable as a client in an edge computing system, configured to perform any of the examples of 1-71.

Example 76 is an edge computing node, operable in a layer of an edge computing network as an aggregation node, network hub node, gateway node, or core data processing node, configured to perform any of the examples of 1-71.

Example 77 is an edge computing network, comprising networking and processing components configured to provide or operate a communications network, to enable an edge computing system to implement any of the examples of 1-71.

Example 78 is an access point, comprising networking and processing components configured to provide or operate a communications network, to enable an edge computing system to implement any of the examples of 1-71.

Example 79 is a base station, comprising networking and processing components configured to provide or operate a communications network, to enable an edge computing system to implement any of the examples of 1-71.

Example 80 is a road-side unit, comprising networking components configured to provide or operate a communications network, to enable an edge computing system to implement any of the examples of 1-71.

Example 81 is an on-premise server, operable in a private communications network distinct from a public edge computing network, the server configured to enable an edge computing system to implement any of the examples of 1-71.

Example 82 is a 3GPP 4G/LTE mobile wireless communications system, comprising networking and processing components configured with the biometric security methods of any of the examples of 1-71.

Example 83 is a 5G network mobile wireless communications system, comprising networking and processing components configured with the biometric security methods of any of the examples of 1-71.

Example 84 is a user equipment device, comprising networking and processing circuitry, configured to connect with an edge computing system configured to implement any of the examples of 1-71.

Example 85 is a client computing device, comprising processing circuitry, configured to coordinate compute operations with an edge computing system, the edge computing system configured to implement any of the examples of 1-71.

Example 86 is an edge provisioning node, operable in an edge computing system, configured to implement any of the examples of 1-71.

Example 87 is a service orchestration node, operable in an edge computing system, configured to implement any of the examples of 1-71.

Example 88 is an application orchestration node, operable in an edge computing system, configured to implement any of the examples of 1-71.

Example 89 is a multi-tenant management node, operable in an edge computing system, configured to implement any of the examples of 1-71.

Example 90 is an edge computing system comprising processing circuitry, the edge computing system configured to operate one or more functions and services to implement any of the examples of 1-71.

Example 91 is networking hardware with network functions implemented thereupon, operable within an edge computing system configured with the biometric security methods of any of examples of 1-71.

Example 92 is acceleration hardware with acceleration functions implemented thereupon, operable in an edge computing system, the acceleration functions configured to implement any of the examples of 1-71.

Example 93 is storage hardware with storage capabilities implemented thereupon, operable in an edge computing system, the storage hardware configured to implement any of the examples of 1-71.

Example 94 is computation hardware with compute capabilities implemented thereupon, operable in an edge computing system, the computation hardware configured to implement any of the examples of 1-71.

Example 95 is an edge computing system adapted for supporting vehicle-to-vehicle (V2V), vehicle-to-everything (V2X), or vehicle-to-infrastructure (V2I) scenarios, configured to implement any of the examples of 1-71.

Example 96 is an edge computing system adapted for operating according to one or more European Telecommunications Standards Institute (ETSI) Multi-Access Edge Computing (MEC) specifications, the edge computing system configured to implement any of the examples of 1-71.

Example 97 is an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETSI) Multi-Access Edge Computing (MEC) configuration, the MEC components configured to implement any of the examples of 1-71.

Example 98 is an edge computing system configured as an edge mesh, provided with a microservice cluster, a microservice cluster with sidecars, or linked microservice clusters with sidecars, configured to implement any of the examples of 1-71.

Example 99 is an edge computing system, comprising circuitry configured to implement one or more isolation environments provided among dedicated hardware, virtual machines, containers, virtual machines on containers, configured to implement any of the examples of 1-71.

Example 100 is an edge computing server, configured for operation as an enterprise server, roadside server, street cabinet server, or telecommunications server, configured to implement any of the examples of 1-71.

Example 101 is an edge computing system configured to implement any of the examples of 1-71 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 102 is an edge computing system, comprising computing nodes operated by multiple owners at different geographic locations, configured to implement any of the examples of 1-71.

Example 103 is a cloud computing system, comprising data servers operating respective cloud services, the respective cloud services configured to coordinate with an edge computing system to implement any of the examples of 1-71.

Example 104 is a server, comprising hardware to operate cloudlet, edgelet, or applet services, the services configured to coordinate with an edge computing system to implement any of the examples of 1-71.

Example 105 is an edge node in an edge computing system, comprising one or more devices with at least one processor and memory to implement any of the examples of 1-71.

Example 106 is an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the examples of 1-71.

Example 107 is a set of distributed edge nodes, distributed among a network layer of an edge computing system, the network layer comprising a close edge, local edge, enterprise edge, on-premise edge, near edge, middle, edge, or far edge network layer, configured to implement any of the examples of 1-71.

Example 108 is an apparatus of an edge computing system comprising: one or more processors and one or more computer-readable media comprising instructions that, when executed by the one or more processors, cause the one or more processors to perform any of the examples of 1-71.

Example 109 is one or more computer-readable storage media comprising instructions to cause an electronic device of an edge computing system, upon execution of the instructions by one or more processors of the electronic device, to perform any of the examples of 1-71.

Example 110 is a communication signal communicated in an edge computing system, to perform any of the examples of 1-71.

Example 111 is a data structure communicated in an edge computing system, the data structure comprising a datagram, packet, frame, segment, protocol data unit (PDU), or message, to perform any of the examples of 1-71.

Example 112 is a signal communicated in an edge computing system, the signal encoded with a datagram, packet, frame, segment, protocol data unit (PDU), message, or data to perform any of the examples of 1-71.

Example 113 is an electromagnetic signal communicated in an edge computing system, the electromagnetic signal carrying computer-readable instructions, wherein execution of the computer-readable instructions by one or more processors causes the one or more processors to perform any of the examples of 1-71.

Example 114 is a computer program used in an edge computing system, the computer program comprising instructions, wherein execution of the program by a processing element in the edge computing system is to cause the processing element to perform any of the examples of 1-71.

Example 115 is an apparatus of an edge computing system comprising means to perform any of the examples of 1-71.

Example 116 is an apparatus of an edge computing system comprising logic, modules, or circuitry to perform any of the examples of 1-71.

Example 117 is at least one machine-readable medium including instructions that, when executed by processing circuitry, cause the processing circuitry to perform operations to implement of any of Examples 1-116.

Example 118 is an apparatus comprising means to implement of any of Examples 1-116.

Example 119 is a system to implement of any of Examples 1-116.

Example 120 is a method to implement of any of Examples 1-116.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network switch for implementing switch-based adaptive transformations, comprising:
   a memory device to store stream information of a plurality of data streams being handled by the network switch, the stream information including a stream identifier, a stream service level agreement (SLA), and a stream traffic type;
   accelerator circuitry to apply stream transformation functions to data streams;
   telemetry circuitry to monitor egress ports of the network switch; and
   scheduler circuitry to:
      receive telemetry data from the telemetry circuitry to determine that a utilization of egress ports of the network switch is over a threshold utilization;
      determine, based on the telemetry data, a selected data stream of the plurality of data streams to transform;
      use the accelerator circuitry to transform the selected data stream to produce a transformed data stream, wherein the transformed data stream complies with a corresponding stream SLA, and wherein a downsampling function is used to transform the selected data stream, the downsampling function to reduce a video resolution of video content in the selected data stream; and
      transmit the transformed data stream on an egress port.

2. The network switch of claim 1, wherein the threshold utilization is based on types of stream traffic being serviced by the network switch.

3. The network switch of claim 1, wherein the threshold utilization is an amount of kilobits per second.

4. The network switch of claim 1, wherein the stream transformation functions include a bitstream function.

5. The network switch of claim 1, wherein the stream transformation functions include a compression function.

6. The network switch of claim 1, wherein the stream transformation functions include a filtering function.

7. The network switch of claim 1, wherein the telemetry circuitry is to calculate and store a data rate transmitted through egress ports of the network switch.

8. The network switch of claim 1, wherein to determine the selected data stream, the scheduler circuitry is to:
   iterate through the plurality of data streams to analyze each subject data stream in the plurality of data streams;
   determine whether a subject data stream is transformable; and
   determine the selected data stream as the subject data stream that is transformable.

9. The network switch of claim 8, wherein to determine whether the subject data stream is transformable, the scheduler circuitry is to:
   look up in the memory device, a stream traffic type based on a stream identifier of the subject data stream; and
   determine whether a transformation function is available for the stream traffic type.

10. The network switch of claim 8, wherein to determine whether the subject data stream is transformable, the scheduler circuitry is to:
    look up in the memory device, a stream SLA based on a stream identifier of the subject data stream; and
    determine whether a current level of service is able to be reduced based on the stream SLA.

11. The network switch of claim 8, wherein the scheduler circuitry is to continue iterating through the plurality of data streams to determine whether another data stream is transformable.

12. The network switch of claim 11, wherein the scheduler circuitry is to abort iterating through the plurality of data streams when the transformation of a subject data stream reduces the utilization of the egress ports under the threshold utilization.

13. The network switch of claim 1, wherein to use accelerator circuitry to transform the selected data stream includes applying a plurality of transformation functions to the selected data stream.

14. A method for implementing switch-based adaptive transformations on a network switch, comprising:
    accessing stream information of a plurality of data streams being handled by the network switch, the stream information including a stream identifier, a stream service level agreement (SLA), and a stream traffic type;
    monitoring egress ports of the network switch to obtain telemetry data;
    determining that a utilization of egress ports of the network switch is over a threshold utilization;
    determining, based on the telemetry data, a selected data stream of the plurality of data streams to transform;
    transforming the selected data stream with a stream transformation function to produce a transformed data stream, wherein the transformed data stream complies with a corresponding stream SLA, and wherein a downsampling function is used to transform the selected data stream, the downsampling function to reduce a video resolution of video content in the selected data stream; and
    transmitting the transformed data stream on an egress port.

15. The method of claim 14, wherein the stream transformation function includes a bitstream function.

16. The method of claim 14, wherein determining the selected data stream, comprises:
    iterating through the plurality of data streams to analyze each subject data stream in the plurality of data streams;
    determining whether a subject data stream is transformable; and
    determining the selected data stream as the subject data stream that is transformable.

17. The method of claim 16, determining whether the subject data stream is transformable, comprises:
    looking up a stream traffic type based on a stream identifier of the subject data stream; and determining whether a transformation function is available for the stream traffic type.

18. The method of claim 16, determining whether the subject data stream is transformable, comprises:
looking up a stream SLA based on a stream identifier of the subject data stream; and
determining whether a current level of service is able to be reduced based on the stream SLA.

19. The method of claim 16, comprising continuing to iterate through the plurality of data streams to determine whether another data stream is transformable.

20. The method of claim 19, comprising aborting iterating through the plurality of data streams when the transformation of a subject data stream reduces the utilization of the egress ports under the threshold utilization.

21. The method of claim 14, wherein transforming the selected data stream includes applying a plurality of transformation functions to the selected data stream.

22. At least one non-transitory machine-readable medium including instructions for implementing switch-based adaptive transformations on a network switch, which when executed by a machine, cause the machine to perform operations comprising:
accessing stream information of a plurality of data streams being handled by the network switch, the stream information including a stream identifier, a stream service level agreement (SLA), and a stream traffic type;
monitoring egress ports of the network switch to obtain telemetry data;
determine that a utilization of egress ports of the network switch is over a threshold utilization;
determining, based on the telemetry data, a selected data stream of the plurality of data streams to transform;
transforming the selected data stream to produce a transformed data stream, wherein the transformed data stream complies with a corresponding stream SLA, and wherein a downsampling function is used to transform the selected data stream, the downsampling function to reduce a video resolution of video content in the selected data stream; and
transmitting the transformed data stream on an egress port.

23. The at least one non-transitory machine-readable medium of claim 22, wherein determining the selected data stream, comprises:
iterating through the plurality of data streams to analyze each subject data stream in the plurality of data streams;
determining whether a subject data stream is transformable; and
determining the selected data stream as the subject data stream that is transformable.

24. The at least one non-transitory machine-readable medium of claim 23, wherein determining whether the subject data stream is transformable, comprises:
looking up a stream traffic type based on a stream identifier of the subject data stream; and
determining whether a transformation function is available for the stream traffic type.

* * * * *